US012159775B2

(12) United States Patent
Denny

(10) Patent No.: US 12,159,775 B2
(45) Date of Patent: Dec. 3, 2024

(54) DECODING MULTIPLEXED MASS SPECTRAL DATA

(71) Applicant: Micromass UK Limited, Wilmslow (GB)

(72) Inventor: Richard Denny, Newcaste-under-Lyme (GB)

(73) Assignee: Micromass UK Limited, Wilmslow (GB)

( * ) Notice: Subject to any disclaimer, the term of this patent is extended or adjusted under 35 U.S.C. 154(b) by 370 days.

(21) Appl. No.: 17/629,175

(22) PCT Filed: Jul. 20, 2020

(86) PCT No.: PCT/GB2020/051729
§ 371 (c)(1),
(2) Date: Jan. 21, 2022

(87) PCT Pub. No.: WO2021/014138
PCT Pub. Date: Jan. 28, 2021

(65) Prior Publication Data

US 2022/0277943 A1 Sep. 1, 2022

(30) Foreign Application Priority Data

Jul. 23, 2019 (GB) ..................................... 1910538

(51) Int. Cl.
*H01J 49/00* (2006.01)
*H01J 49/40* (2006.01)

(52) U.S. Cl.
CPC ...... *H01J 49/0036* (2013.01); *H01J 49/0031* (2013.01); *H01J 49/406* (2013.01)

(58) Field of Classification Search
None
See application file for complete search history.

(56) References Cited

U.S. PATENT DOCUMENTS

| | | | | |
|---|---|---|---|---|
| 4,785,172 | A | 11/1988 | Kubena et al. | |
| 2013/0048852 | A1* | 2/2013 | Verenchikov ........... | H01J 49/22 250/282 |

(Continued)

FOREIGN PATENT DOCUMENTS

| | | | |
|---|---|---|---|
| CN | 106463328 | A | 2/2017 |
| CN | 106463337 | A | 2/2017 |
| GB | 2562363 | A | 11/2018 |

(Continued)

OTHER PUBLICATIONS

International Search Report and Written Opinion for International Application No. PCT/GB2020/051729, mailed Oct. 2, 2020.

(Continued)

*Primary Examiner* — Lina Cordero
(74) *Attorney, Agent, or Firm* — Goodwin Procter LLP

(57) ABSTRACT

There is provided a method of decoding a first data set obtained from a time of flight (ToF) mass analyser operating according to an encoded frequency pulsing (EFP) scheme. The method comprises generating a mock data set based on a model set of ions taking account of the EFP pattern and the flight time distribution of the ions. The model set of ions is then iteratively updated using the first data set to determine a second, decoded data set.

15 Claims, 6 Drawing Sheets

(56) References Cited

U.S. PATENT DOCUMENTS

| | | | | |
|---|---|---|---|---|
| 2013/0168546 | A1* | 7/2013 | Denny | H01J 49/40 250/282 |
| 2017/0084443 | A1* | 3/2017 | Willis | H01J 49/0027 |

FOREIGN PATENT DOCUMENTS

| | | | |
|---|---|---|---|
| GB | 2563565 | A | 12/2018 |
| WO | 2011098834 | A1 | 8/2011 |
| WO | 2011135477 | A1 | 11/2011 |

OTHER PUBLICATIONS

Muller, M., et al., "A new software tool for the analysis of high resolution PTR-TOF mass spectra", Chemometrics and Intelligent Laboratory Systems, 127:158-165, Jun. 29, 2013.

Strittmatter, E. F., et al., "High Mass Measurement Accuracy Determination for Proteomics Using Multivariate Regression Fitting: Application to Electrospray lonization Time-of-Flight Mass Spectrometry", Analytical Chemistry, 75(3):460-468, Jan. 4, 2003.

Combined Search and Examination Report for GB2011190.2, mailed Dec. 1, 2020.

* cited by examiner

DECODING MULTIPLEXED MASS SPECTRAL DATA

CROSS-REFERENCE TO RELATED APPLICATIONS

This application is a U.S. national phase filing claiming the benefit of and priority to International Patent Application No. PCT/GB2020/051729, filed Jul. 20, 2020, which claims priority from and the benefit of United Kingdom patent application No. 1910538.6 filed on Jul. 23, 2019. The entire contents of these applications are incorporated herein by reference.

FIELD OF THE INVENTION

The present invention relates generally to time of flight (ToF) mass spectrometry in which ions are pulsed into the ToF mass analyser at a relatively high rate, resulting in a multiplexed ion signal.

BACKGROUND

Traditional ToF mass analysers have flight paths that lead to separation timescales of the order of around 20 μs to 200 μs for mass ranges up to a few thousand Dalton. However, more recently, ToF mass analysers which have relatively longer flight paths have been developed enabling ions to be analysed with a relatively high mass resolution, such as multi-reflecting ToF mass analysers.

Historically, typical ToF mass analysers have been operated according to a 'pulse-and-wait' operating scheme wherein a mass spectrum is recorded for all of the ions within a pulse before the next packet of ions is pulsed, such that ions from different pulses do not temporally overlap.

To increase duty cycle, especially for ToF mass analysers having relatively longer flight paths, techniques have been developed in which ions are pulsed into the ToF mass analyser at a relatively higher rate, such that ions from different pulses are caused to temporally overlap, resulting in multiplexed spectral data containing ion signals from different pulses. The resulting spectral data must then be decoded (i.e. demultiplexed) in order to obtain a meaningful mass spectrum for the sample.

To facilitate this it is known to operate the ToF mass analyser according to a so-called "encoded frequency pulsing" (EFP) scheme wherein ions are pulsed into the ToF mass analyser multiple times, e.g. per transient, with non-uniform time intervals between each pulse.

The mass spectral data can then be decoded (demultiplexed) based on knowledge of the pulsing scheme.

It is believed there is scope for improved methods for decoding mass spectral data obtained using such EFP schemes.

SUMMARY

According to an aspect there is provided a method of decoding mass spectral data that has been obtained from a time of flight (ToF) mass analyser operating according to an encoded frequency pulsing (EFP) scheme wherein ions are pulsed into the ToF mass analyser multiple times with non-uniform time intervals between each pulse at such a rate that the mass spectral data contains multiplexed ion signals representing ion arrival times recorded at a detector for ions from different ion pulses, the method comprising: obtaining a first data set to be decoded, the first data set representing a set of multiplexed ion arrival times recorded using the ToF mass analyser; and decoding the first data set to determine a second data set, the second data set representing one or more demultiplexed mass spectra relating to the flight times for the ions that were pulsed into the ToF mass analyser to generate the first data set, wherein the decoding comprises: (i) generating a mock data set representing a set of multiplexed ion arrival times for a model set of ions, wherein the step of generating the mock data set accounts for the EFP pattern used to pulse ions into the ToF mass analyser and the flight time distribution for the model set of ions in the ToF mass analyser, (ii) comparing the mock data set with the first data set; (iii) updating the model set of ions based on the comparison; (iv) repeating steps (i)-(iii) to iteratively update the model set of ions; and (v) using the updated model set of ions to determine the second data set.

The above approach allows an improved scheme for decoding multiplexed mass spectral data of the type generated from an EFP experiment. It will be understood that EFP refers to a method of operating a ToF mass analyser wherein ions are pulsed into the ToF mass analyser multiple times with non-uniform time intervals between each pulse at such a rate that ions from different pulses can overlap in the ToF mass analyser such that the resulting mass spectral data set contains overlapping ion signals (recorded arrival times for ions) from different ion pulses. This can therefore lead to highly multiplexed mass spectral data sets that need to be decoded in order to determine the ion species that generated the mass spectral data sets.

For instance, ions may be pulsed multiple times per transient such that the transient contains overlapping ion peaks from different ion pulses. The first data set may thus represent a set of multiplexed ion arrival times for ions recorded in one or more transient(s).

For the avoidance of doubt it will be understood that a "transient" is the time over which a single encoded mass spectrum (covering the entire mass to charge range of interest, from low to high) is accumulated and the duration of a transient thus corresponds to the flight time for the highest mass-to-charge ratio ion within the mass range that is being recorded. A transient thus serves as a convenient time measure for breaking up the data that may reflect both the pulse pattern and the longest flight time of interest.

However, it will be appreciated that a transient is essentially an arbitrary time measure. Thus, rather than recording and processing the data on a per transient basis it will be appreciated that the first data set could be recorded continuously and then broken up into segments for decoding according to any arbitrary time intervals that may, for example, be associated with some maximum flight time. Thus, whilst the processing may be (and typically is) performed on the basis of ions recorded in one or more transient(s), it will be appreciated that this is not necessary.

Traditional decoding schemes for multiplexed mass spectral data may take the pulse pattern into account. However, traditional methods typically rely on an assumption that the detector response (the measured ion arrivals) will necessarily overlap with the width of an ion peak.

The present approach works instead by modelling the ion arrival times using a model that accounts not only for the pulse pattern but also the flight time distribution (and/or 'energy spread') for ions within the ToF mass analyser, e.g. the broadening of the recorded ion signals (compared to the ideal single ion flight time) due to variations in the initial energy and/or position of the ions. Thus, the actual distribution of the recorded ion arrival times can be taken into account.

For instance, the flight time distribution for ions travelling within a given ToF mass analyser will generally be known, or can reliably be modelled, and is typically well-described by a suitable impulse response (or 'point spread') function that describes this broadening and that will generally depend on the flight time and/or mass to charge ratio of the ions. Taking this additional information into account can therefore provide an improved (more accurate) decoding.

Further, the above approach may be better able to handle cases where the ion intensity may change over time, for example, on a transient by transient (or even sub-transient) basis, as will be explained further below.

The present approach thus provides various improvements compared to other known approaches for decoding multiplexed mass spectral data.

Another aspect extends to a method of mass spectrometry comprising: passing ions to a time of flight (ToF) mass analyser; operating the ToF mass analyser according to an encoded frequency pulsing (EFP) scheme wherein ions are pulsed into the ToF mass analyser multiple times with non-uniform time intervals between each pulse at such a rate that the mass spectral data set contains multiplexed ion signals representing ion arrival times recorded at a detector for ions from different ion pulses to generate a first data set representing a set of multiplexed ion arrival times recorded using the ToF mass analyser; and decoding the first data set to determine a second data set, the second data set representing one or more demultiplexed mass spectra relating to the flight times for the ions that were pulsed into the ToF mass analyser to generate the first data set, wherein the decoding comprises: (i) generating a mock data set representing a set of multiplexed ion arrival times for a model set of ions, wherein the step of generating the mock data set accounts for the EFP pattern used to pulse ions into the ToF mass analyser and the flight time distribution for the model set of ions in the ToF mass analyser; (ii) comparing the mock data set with the first data set; (iii) updating the model set of ions based on the comparison; (iv) repeating steps (i)-(iii) to iteratively update the model set of ions; and (v) using the updated model set of ions to determine the second data set.

Also provided is a mass spectrometer for performing such methods. The mass spectrometer may thus comprise a ToF mass analyser, optionally an ion separation device upstream of the ToF mass analyser, and suitable decoding circuitry that is configured for decoding the data obtained from the ToF mass analyser. The decoding circuitry may thus be configured to decode a first data set representing a set of multiplexed ion arrival times recorded using the ToF mass analyser to determine a second data set, the second data set representing one or more demultiplexed mass spectra relating to the flight times for the ions that were pulsed into the ToF mass analyser to generate the first data set. In particular the decoding circuitry may be configured to decode such data by: (i) generating a mock data set representing a set of multiplexed ion arrival times for a model set of ions, wherein the step of generating the mock data set accounts for the EFP pattern used to pulse ions into the ToF mass analyser and the flight time distribution for the model set of ions in the ToF mass analyser; (ii) comparing the mock data set with the first data set; (iii) updating the model set of ions based on the comparison; (iv) repeating steps (i)-(iii) to iteratively update the model set of ions; and (v) using the updated model set of ions to determine the second data set.

The present embodiments relate to the decoding of mass spectral data obtained from a ToF mass analyser operating according to an EFP scheme. Thus, a first data set is obtained representing the ion arrival times recorded at a detector of the ToF mass analyser, which first data set must be decoded in order to determine the ion species that were passed into the ToF mass analyser (in other words to demultiplex, or 'unwrap', the first data set). The first data set may thus be obtained from the detector of the ToF mass analyser.

Of course the first data set may be stored prior to being decoded. Thus, the first data set may be obtained from storage, or transmitted to another device for processing (decoding), and so on.

In order to decode the first data set, a mock set of ion arrival times is generated based on a notional (model) set of ions. The mock (i.e. modelled) ion arrival times can then be compared with the first data set and the model set of ions (i.e. the model input) iteratively adjusted until the mock ion arrival times sufficiently match the ion arrival times in the first data set, at which point the model set of ions can be used to determine an output representing the decoded data set.

The comparison may be made in any desired fashion. For example, in embodiments, a ratio (or set of ratios) between the ion arrival times for each ion species is determined. However, in general, any other suitable measure of similarity may be used, as desired.

During the iteration, the result of the comparison (the ratio, for example) can then be projected back through the model and used to update the model set of ions. The ion arrival times can then be modelled again based on the new (updated) model set of ions, and so on, in an iterative manner at least until a threshold criterion has been satisfied.

For example, the iteration may be performed until the mock data set sufficiently matches the obtained first data set, within a certain defined similarity threshold. Alternatively the iteration may be performed for a certain number of cycles. Other arrangements would of course be possible.

Thus, in embodiments, generating the mock data set comprises first obtaining a set of notional unbroadened flight times for the model set of ions. The model set of ions may be stored in terms of their flight times in which case this step may simply involve obtaining the model of ions. However, in some cases, the model set of ions may be stored in terms of their mass to charge ratio, for example, in which case this will be need to be converted into flight times (using knowledge of the ToF mass analyser).

The unbroadened flight times (in 'hidden' data space) are then converted into a set of broadened flight times (in 'visible' data space), taking account of the flight time distribution in the ToF mass analyser, as may be defined by a suitable impulse response function. The flight distribution for the ToF mass analyser thus reflects the amount of broadening each ion species will experience as it travels through the ToF mass analyser towards the detector, with the amount of broadening typically increasing with flight time.

The impulse response function may thus describe how the ion signals for ions having a particular mass to charge ratio (and hence flight time) (an 'impulse') will be broadened as the ions travel through the ToF mass analyser to the detector (the 'response'). The impulse response function thus defines for each ion species (or flight time) the relationship between its unbroadened (or ideal) flight time and the broadened ion signal representing the ion signal that would be recorded at the detector.

Thus, in embodiments, once the unbroadened flight times have been obtained, generating the mock data set comprises a first step of converting the unbroadened flight times into a corresponding set of broadened flight times accounting for the flight time distribution (or ToF blur) in the ToF mass analyser. In embodiments this is done by applying an impulse response function for each of the unbroadened flight times the impulse response function describing how the flight time for an ion species should be broadened as the ions travel through the ToF mass analyser.

The broadened flight times thus effectively represent the expected ion arrival times in the case where the EFP scheme is disabled (such that there is no multiplexing or overwrapping of ions from adjacent pulses or transients).

Thus, a second step is performed of generating the mock data set by encoding the broadened flight times based on the EFP pattern to determine a set of multiplexed ion arrival times. These modelled ion arrival times can then be compared with the measured ion arrival times, as explained above.

Although described above as two steps, it will be appreciated that these steps could in principle be combined into a single processing step. However, in embodiments, the modelling does indeed comprise two distinct steps with the intermediate broadened flight times being at least temporarily stored and usable.

For instance, in embodiments, the unbroadened flight times (the hidden space data) may be provided for output (as the second data set). That is, the unbroadened flight times for the model set of ions (from the final iteration) may be provided for output. It will be appreciated that this will essentially correspond to a mass spectrum with enhanced resolution, with the ToF blurring effectively removed. This may be advantageous in some cases. In this case, it would be possible when generating the mock data set(s) to transform between the unbroadened flight times to the ion arrival times in a single step accounting for both the EFP pattern and the ion flight time distribution in the ToF mass analyser.

In other embodiments, the broadened flight times (the visible space data) may be provided for output (as the second data set). That is, the output may be provided as the broadened flight times for the model set of ions (from the final iteration). In that case the model should include two separate steps, at least for the final iteration, such that the intermediate broadened flight times can be extracted. Knowledge of the broadened flight times may be beneficial since this may more accurately reflect the results of the ToF analysis, and so may be more comparable with other data sets, and so on. For instance, the visible space output may look like a smoother version of a non-EFP mass spectrum.

In EFP experiments it will be appreciated that a given ion species may be recorded multiple times. That is a single ion species may be associated with multiple ion arrival times as it may be pulsed multiple times. It would thus be desirable to compress these multiple measured ion arrival times into a single flight time for that ion species. Thus, in other embodiments, the output may comprise a set of ion arrival time data that has been assigned a flight time on the basis of the broadened flight time signals.

Of course, any desired output may be provided including any combination of the above. Another advantage of the present embodiments is thus that a greater number of types of information can be extracted for output using the model described herein.

In steady state conditions it can be assumed that the ions in each pulse (and transient) essentially repeat such that the intensity of a given ion species will remain substantially constant from pulse to pulse (and from transient to transient).

However, this may not always be the case. For instance, in embodiments, the ToF mass analyser may be coupled to an upstream ion separation device. In that case the intensity for an ion species may vary over time from pulse to pulse (and across transients).

This may particularly be the case where the time profiles associated with an upstream ion separation are shorter than the duration of a transient (which may especially occur, for example, when the ToF mass analyser has a relatively extended flight path, such as in a multi-reflecting ToF arrangement).

Thus, in embodiments, the ions are separated upstream of the ToF mass analyser such that the intensity of ions arriving at the ToF mass analyser changes over time. For instance, in embodiments, the ions may be separated according to mass, mass to charge ratio or ion mobility upstream of the ToF mass analyser.

Traditional decoding schemes are not well equipped to decode such data. However the present approach can readily be extended to such data sets.

For instance, in a similar fashion as described above wherein the model takes account of the flight time distribution for ions separating in the ToF mass analyser and arriving at the detector, it is also possible to construct a suitable function representing the variation in intensity of the ion species arriving at the ToF mass analyser over time due to the upstream ion separation. Thus, it is possible to generate a 'correlation' function describing the variation over time of the ion species arriving at the ToF mass analyser which function can thus be used to model which ion species (having which flight times) are being pulsed at which time. For example, this may be a smooth function representing ion peaks coming out of the ion separation device (which will typically be broader than the ion peaks in the ToF mass analyser).

That is, rather than modelling the data as a single sequence of discrete species, the model may comprise a plurality of channels corresponding to time points associated with the upstream ion separation with each channel containing a respective model set of ions corresponding to the ions that arrive at the ToF mass analyser at that time point.

These time points might coincide with the push times of the EFP pattern, but this restriction is not necessary (and any discrepancy here can be corrected for during the second step, as will be explained further below).

In this way it is possible to account for the fact that the ions in each pulse may change as a result of the upstream ion separation (as opposed to steady state conditions) and to correlate within the model the ions arriving at the ToF mass analyser (coming out of the upstream ion separation device) at a particular time with the ions being pushed into the ToF mass analyser at that time.

Thus, when generating the mock data set, the first step may further comprise applying a correlation function to the model set of ions representing the time variation of the ions arriving at the ToF mass analyser due to the upstream ion separation.

In this way, the present approach is able to decode EFP mass spectral data on sub-transient timescales.

It will be appreciated that the EFP pattern may be quite different to the desired sampling pattern for the upstream ion separation. For example, in order to generate 'two-dimensional' spectral data incorporating the output of the upstream ion separation (as well as the mass-to-charge data), it would typically be desirable to sample data points for the upstream ion separation in a uniform manner. Furthermore, the desired sampling rate may be quite different to the EFP rate.

In embodiments this is accounted for using a suitable mapping function between the EFP pattern and a desired sampling pattern for the upstream ion separation. Thus, when generating the mock data set, the second step may further comprise mapping the EFP pattern onto a sampling pattern of the upstream ion separation.

In embodiments, the functions and operations described above can be represented using suitable matrices. Matrix multiplication used to combine different functions of correlations when transforming the source data to the ion arrival times.

For instance, the unbroadened flight times for the model ions may be stored as a first vector (h). In order to transform this into a set of broadened flight times (which may be stored as a second vector, v), the first vector may be multiplied by a first matrix (F) that applies the ToF flight time distribution, and optionally a second matrix (G) encoding the correlation function across the time points of the upstream ion separation. In matrix notation, the first step of generating the model may thus be written as: $v=G.F.h$.

The broadened flight times (v) can then be converted into a multiplexed set of ion arrival times (defined in vector form as m) by suitably multiplying the broadened flight time vector by a third matrix (Q) encoding the EFP pattern and optionally a fourth matrix (P) encoding a re-sampling from the upstream ion separation time points onto the pulse times. That is, the second step may be written as: $m=Q.P.v$.

However, these functions may of course be defined in any other suitable fashion, as desired.

Further, it will be understood that where there is reference to a data set including or representing, for example, a plurality of ion peaks, ion arrival times, or flight times, this generally means data indicative of the plurality of ion peaks, arrival times, flight times and so on. That is, there is no particular restriction on the form in which the data is stored and the data may be stored in any suitable manner that allows the original information to be obtained therefrom and processed in the manner described herein.

The methods in accordance with the present invention may be implemented at least partially using software e.g. computer programs. It will thus be seen that when viewed from further aspects the present invention provides computer software specifically adapted to carry out the methods herein described when installed on data processing means, a computer program element comprising computer software code portions for performing the methods herein described when the program element is run on data processing means, and a computer program comprising code means adapted to perform all the steps of a method or of the methods herein described when the program is run on a data processing system. The data processing system may be a microprocessor, a programmable FPGA (Field Programmable Gate Array), or any other suitable system.

The invention also extends to a computer software carrier comprising such software which when used to operate a graphics processor, renderer or microprocessor system comprising data processing means causes in conjunction with said data processing means said processor, renderer or system to carry out the steps of the methods of the present invention. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the invention need be carried out by computer software and thus from a further broad aspect the present invention provides computer software and such software installed on a computer software carrier for carrying out at least one of the steps of the methods set out herein.

The present invention may accordingly suitably be embodied as a computer program product for use with a computer system. Such an implementation may comprise a series of computer readable instructions either fixed on a tangible medium, such as a non-transitory computer readable medium, for example, diskette, CD ROM, ROM, RAM, flash memory, or hard disk. It could also comprise a series of computer readable instructions transmittable to a computer system, via a modem or other interface device, either over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

BRIEF DESCRIPTION OF THE DRAWINGS

Various embodiments will now be described, by way of example only, and with reference to the accompanying drawings in which.

DETAILED DESCRIPTION

Various embodiments will now be described with respect to encoded frequency pulsing (EFP). EFP improves the duty cycle of long time of flight (ToF) instruments by overlaying spectra initiated at different start times (pushes). The time over which a single encoded spectrum is accumulated is called a transient and the length of the transient corresponds to the highest significant mass to charge ratio entering the ion flight path. As the push times are staggered within a transient, ions pushed in one transient may be recorded in the next.

In the present embodiments it will be assumed that the push pattern repeats from transient to transient. However, it will be understood that this need not be the case, and the push pattern may change from transient to transient.

Further, whilst the decoding scheme in the present embodiments will be performed with reference to transients, it will be appreciated that this need not be the case and that the data could be recorded continuously and decoded with reference to any arbitrary time intervals.

Figure 1:
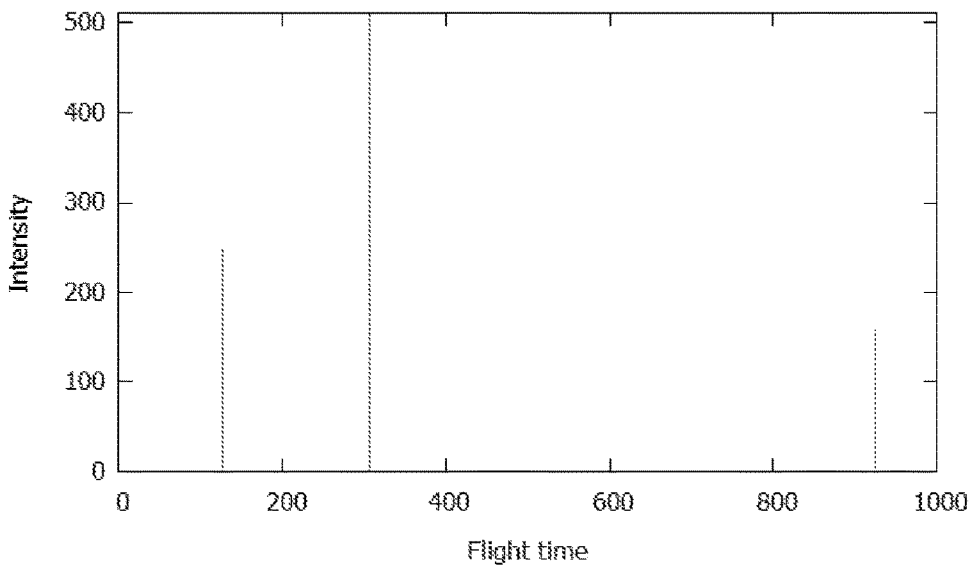
FIG. 1 shows the unbroadened flight times for three different ion species.

In a steady state situation, wherein the intensity of a particular species is not changing significantly from push to push across the transient, the original signal might be modelled as a sequence of discrete species at various times of flight. A simple example of this is shown in FIG. 1.

Figure 2:
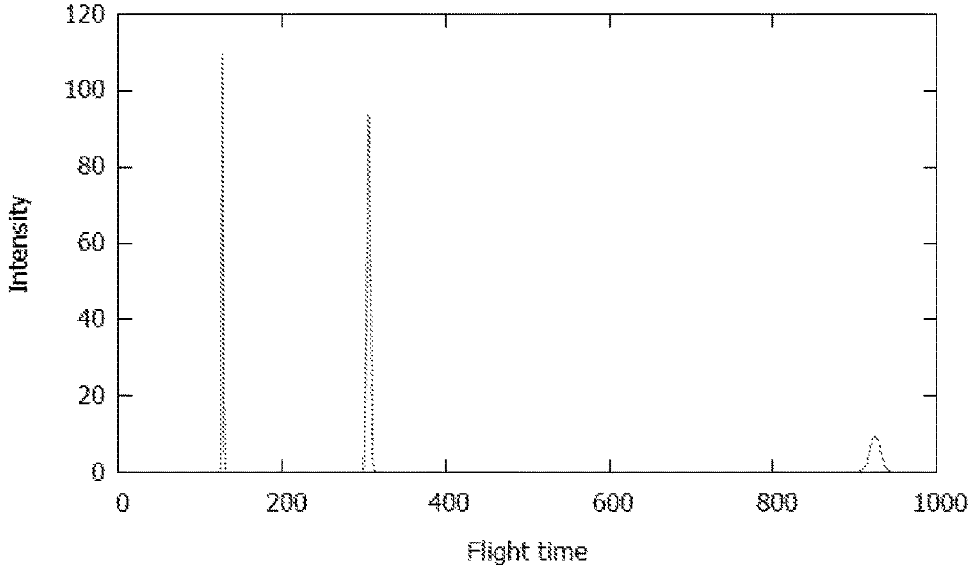
FIG. 2 illustrates the blurring of the flight times for the three ion species shown in FIG. 1 shown due to flight time distribution in a time of flight (ToF) mass analyser.

In a ToF instrument, the impulses are blurred in to peaks due to a small flight time distribution. In FIG. 2 the discrete species of FIG. 1 have been blurred into peaks according to a flight time distribution representing the broadening associated with each ion species so that the peak width increases proportionally with flight time (i.e. mass to charge ratio).

EFP transforms the flight time distribution into an arrival time distribution according to the chosen pattern of pushes. In steady state the transformed spectrum wraps around modulo the transient time as shown FIG. 3.

The arrival time distribution of ions is then effectively sampled (by a Poisson process) to give the observed spectrum of ion arrivals. In reality, other instrument effects such as detector response may come into play, and may also be modelled appropriately, but for simplicity these will not be discussed here.

Figure 3:
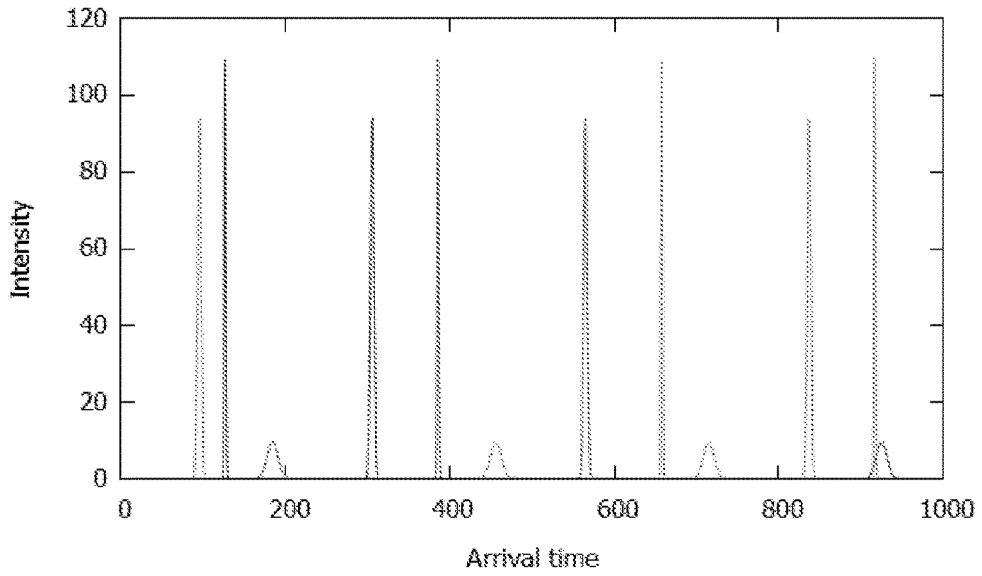
FIG. 3 shows the EFP ion arrival time distributions for the three ion species shown in FIG. 1.

A steady-state decoding method might aim to reconstruct the original sequence of discrete species, as in FIG. 1, from the observed spectrum of ion arrivals, sampled from an ion arrival distribution as in FIG. 3. As the system is in a steady state the reconstruction need only consider a single sequence of discrete species (corresponding to one transient or less in flight time) as no time variation of each species occurs.

The reconstruction might be produced using a maximum entropy deconvolution method, Richardson-Lucy deconvolution or other technique involving enforcement of non-negativity constraints and perhaps some form of regularisation.

Figure 4:
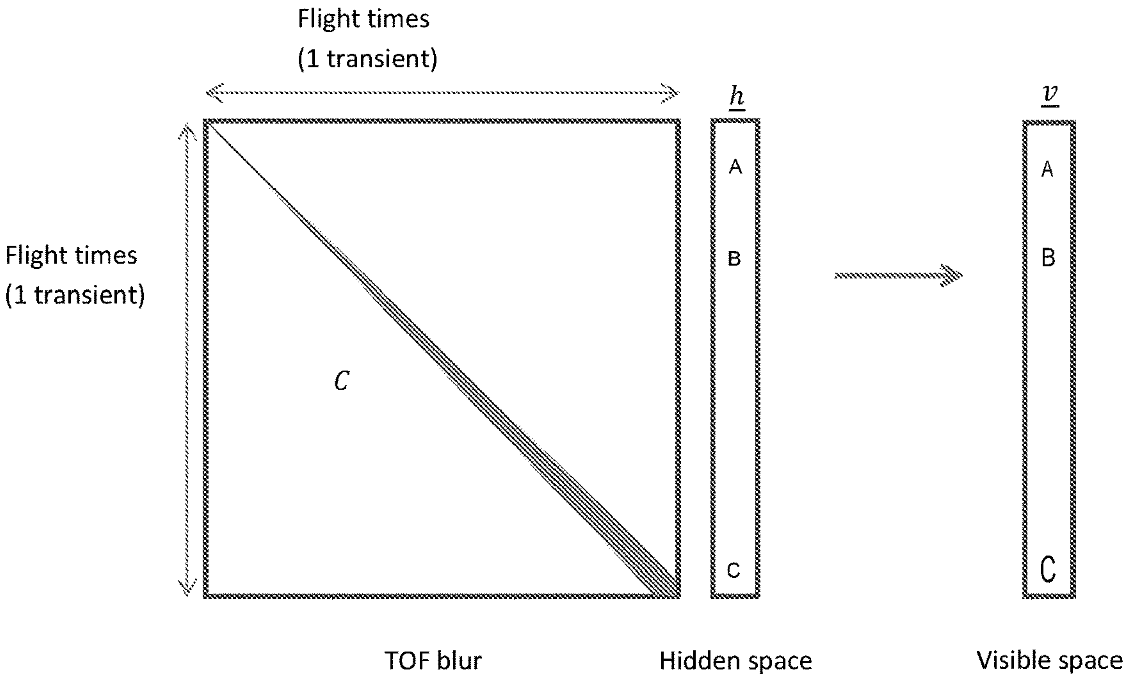
FIG. 4 illustrates a mapping between the unbroadened flight times (in hidden space) and the broadened flight times (in visible space)
Figure 5:
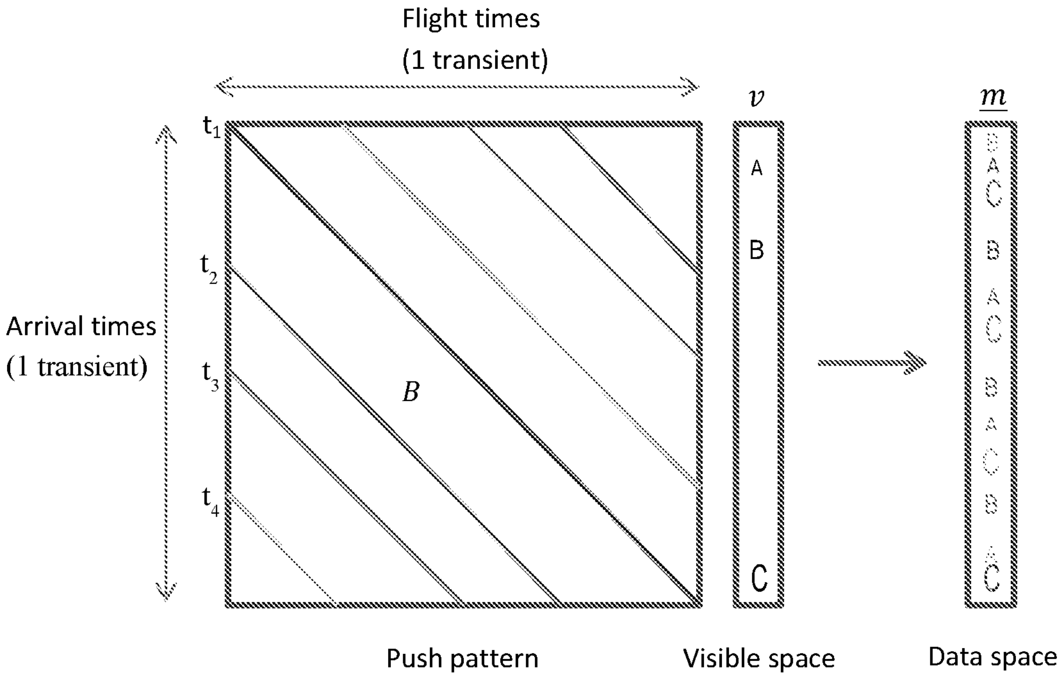
FIG. 5 illustrates a mapping between the broadened flight times (in visible space) and the EFP arrival times (in data space)

In outline, the approach would be to model the transformation from a (hidden space) sequence of discrete species through a ToF-blurred flight time distribution (visible space) (FIG. 4) to an arrival time distribution (data space) (FIG. 5). The arrival time distribution is then compared with the observed data and changes are fed back to the sequence of discrete species to reduce the misfit (increase the likelihood), meet any constraints and improve the objective of any regularisation.

In FIG. 4 the matrix C embodies the blurring due to the ToF instrument resolution, each column of C corresponding to the impulse response function representing the flight distribution for the ToF mass analyser at a particular flight time. The eventual output of the decoding procedure might be the visible space map, $\underline{v}$, or derived from it. The broadening diagonal band in $\underline{C}$ and the lengthening of the font used to label the species in vector $\underline{v}$ indicate the broadening of the ToF impulse response function. The blank regions of the matrix indicate zero elements.

FIG. 5 then shows the mapping from the visible space map to the data space map. The matrix B describes the pattern of push times, each column of B corresponding to the push pattern rotated downwards by the flight time index, thereby mapping from flight time to arrival time. The result, m, is the mock data, i.e., the model intensities in data space. The colours in matrix B and vector m indicate the different pushes as in FIG. 3.

The upper diagonal of B indicates that the arrival times are folded in (modulo the transient length) from the previous transient. The blank regions of the matrix indicate zero elements.

Assuming the transient length, T, arrival times, $t_k$, flight times, $t_j$, and push times, $t_p$, are digitised consistently, the mapping B, involving rotated copies of the push pattern, has components:

$$B_j^k = \begin{cases} 1 & \text{for } t_j + t_p = t_k \bmod T, \\ 0 & \text{otherwise.} \end{cases}$$

It will be convenient later to make use of the flexibility of tensor notation, so the mapping, B, is written as a mixed second order tensor. The "mod T" qualifier allows ions originating in the previous transient to be considered in the current transient and is appropriate for a system in steady state.

In order to make a practical decoding scheme, derivatives of some objective function, $\phi(d, m(h))$, are required, where d is the vector of data values, m is the vector of mock data and h is a vector of "hidden" values from which the mock data are generated.

An example of a suitable decoding algorithm is the Richardson-Lucy algorithm, as will be described below. However, other suitable algorithms may be used, as appropriate.

A useful result here is that scalar function f(y) of a vector y with derivative vector $$\frac{\partial f}{\partial y^j}$$

has a derivative vector with respect to a vector x of:

$$\frac{\partial f}{\partial x^i} = P_i^j \frac{\partial f}{\partial y^j},$$

where $y^j = P^j_i x^i$. Note that the Einstein Summation Convention (ESC) is used here (wherein a sum is implied when the same index appears both raised and lowered in the same statement, e.g., $P^j_i x^i \equiv \Sigma_i P^j_i x^i$.)

As a specific example of a deconvolution procedure, consider the basic Richardson-Lucy algorithm with:

$$\phi(d, m(h)) = \log Pr(d, m(h)) = \text{constant} - \sum_i \alpha h^i + \sum_k -m^k + d^k \log m^k,$$

where α defines an exponential prior on the values of H, so that:

$$\frac{\partial\phi}{\partial m^k} = \frac{d^k}{m^k} - 1_k,$$

where $1_k$ is a co-vector of ones.

The mock data, m, can then be written in terms of a hidden space vector, h, via a visible space vector, v, and β, a small constant background contribution to each data point, so that:

$$m^k=\beta 1^k+B^k_j v^j=\beta 1^k+B^k_j C^j_i h^i.$$

The visible space vector, v, can then be mapped to the data space mock data by application of B and is generated by the application of the “intrinsic correlation function”, C, to h.

The benefit of this division of the mapping from h to m is that any correlations required to be in the output are imposed through the application of C before the encoding transformation involving B is made to data space.

This is particularly useful when the data are (or are proportional to) a histogram of ion arrivals so that the arrivals associated with a particular species and a particular push may be separated in time.

The maximum of ϕ, will be given where $$\frac{\partial\phi}{\partial h^i} = 0_i,$$

which leads to:

$$B^k_j C^j_i r_k = B^k_j C^j_i 1_k + \alpha\, 1_i,$$

where $$r_k = \frac{d^k}{m^k},$$

one for each data point and $1_i$ is a co-vector of ones with the dimension of h.

The Richardson-Lucy update rescales the components of h towards this condition through:

$$h^i \leftarrow h^i\left[\frac{g_i}{z_i}\right] \text{ (suppressing } ESC\text{)},$$

where $g_i=B^k_j C^j_i r_k$ and $z_i=B^k_j C^j_i 1_k+\alpha 1_i$.

Once the termination criteria have been met, the output may be taken to be v or, if h is sufficiently sparse, a data point may be mapped to a visible space point with a majority of responsibility for it, according to responsibilities $R^j_k$ such that:

$$0 \le R^j_k = \frac{B^k_j v^j}{m^k} \le 1 \text{ (suppressing } ESC\text{)},$$

so that the visible space output is:

$$s^j = \left(\sum_{R^j_k>1/2} d^k\right)\left(\sum_k B^k_j\right)^{-1}$$

or proportional to it.

At termination the hidden space vector, h, may also be of interest, particularly as it may exhibit higher resolution than v or s, but it must be remembered that it is unphysical in the sense that it does not have the required correlations of visible space.

The termination criterion could be as simple as reaching a fixed number of iterations, or could be when the mock data is determined to be sufficiently similar to the recorded data.

An outline of the steady state algorithm will now be provided.

Steady State Algorithm Outline

1) Setup

Project unit data back to hidden space to get normalisation constants, $$z_i=B^k_j C^j_i 1_k+\alpha 1_i.$$

2) On Data Input, Set Initial Model

Set each of the $h^i$ to some constant value greater than zero, $\bar{h}$, (perhaps as a multiple of the background level, β), $$h^i \leftarrow \bar{h} 1^i.$$

Project h forward to get initial mock data, m, $$m^k \leftarrow \beta 1^k+B^k_j C^j_i h^i.$$

3) Until Termination

Calculate data to mock data to ratios, $$r_k \leftarrow \frac{d^k}{m^k}.$$

Project the ratios back to hidden space, $$g_i \leftarrow B^k_j C^j_i r_k.$$

Update hidden sources, $$h^i \leftarrow h^i\left[\frac{g_i}{z_i}\right] \text{ (suppressing } ESC\text{)}.$$

Project the hidden sources forward to mock data via visible space, $$v^j \leftarrow C^j_i h^i,$$

$$m^k \leftarrow \beta 1^k+B^k_j v^j.$$

4) Assign Values to Output Spectrum

Optionally, set output spectrum, s, using v and m to construct responsibilities, $R^j_k$, $$s^j = \left(\sum_{R^j_k>1/2} d^k\right)\left(\sum_k B^k_j\right)^{-1}.$$

Alternatively, copy the visible space vector to the output, $$s^j=v^j.$$

The above analysis assumes steady state conditions, wherein the ion species in each pulse are substantially the same. However, it is often desirable to couple ToF mass analysers to an upstream ion separation device such as an ion mobility separator, or mass separation device (which may comprise a scanning quadrupole mass filter, for example). Traditional ToF mass analysers require separation timescales of the order of around 20 μs to 200 μs for mass ranges up to a few thousand, dependent on the ToF mass analyser geometry. In contrast, typical faster IMS peak widths are of the order 0.4 ms to 1 ms, depending on the IMS geometry. The two separation timescales for these devices are therefore well-matched, as the ToF separation time scale is significantly shorter than the IMS separation time scale, and hence multiple ToF mass spectra can be individually acquired across the IMS peak. This allows, for example, two-dimensional nested data sets to be produced, wherein one dimension is the ToF mass and the other dimension is the IMS separation time.

However, the advent of ToF mass analysers which have a relatively long flight path, such as multi-reflecting ToF mass analysers, has enabled ions to be analysed with a relatively high mass resolution. The ions therefore have a relatively long flight time through such mass analysers. When coupled with an upstream ion separation device, this means that the intensity of a given ion species may change over time from transient to transient such that steady state conditions can no longer be assumed to apply.

The present embodiments provide a decoding algorithm that is able to decode multiplexed mass spectral data sets with sub-transient time resolution.

Figure 7:
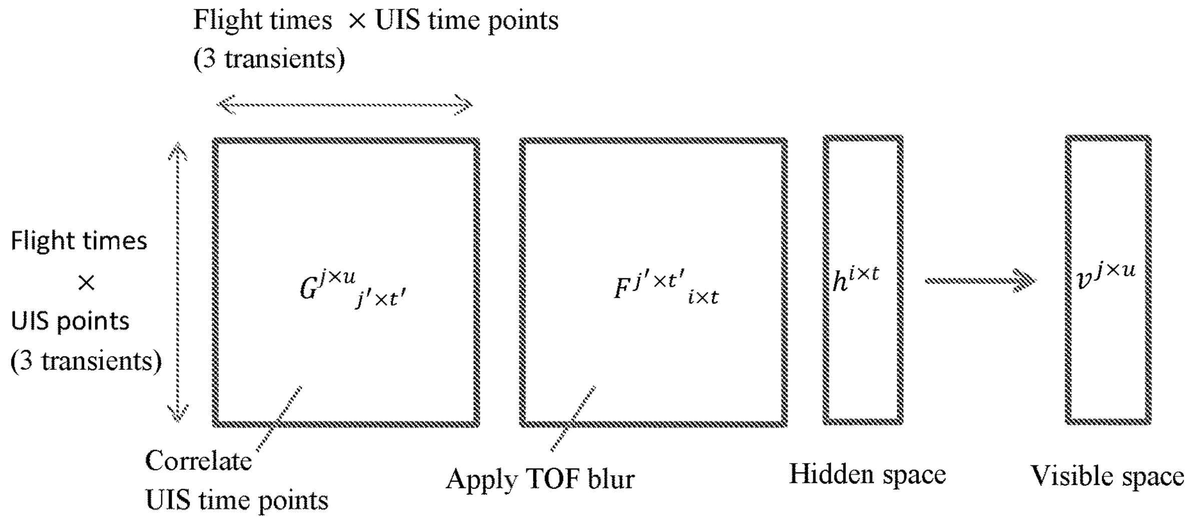
FIG. 7 illustrates a mapping between the unbroadened flight times (in hidden space) and the broadened flight times (in visible space) that takes into account a time variation introduced by an upstream ion separation.

To do this, instead of modelling the data as a single sequence of discrete species, the model might consist of a number of channels corresponding to time points associated with upstream ion separation (UIS) (see FIG. 7). These time points might coincide with the push times of the EFP pattern, but this restriction is not necessary (and any discrepancy here can be corrected for, as will be explained further below).

The hidden space UIS time points may be chosen to sample the expected time variations with sufficient granularity.

In terms of the analysis above, we now have a mapping with components $C^{ju}_{it}$ from a hidden space array, $h^{it}$, to a visible space array, $v^{ju}$. The pairs of indices it and ju indicate that the correlation is over flight time (i, j) and UIS time points (t, u). This is the product of $F^{j't'}_{it}$ which applies the ToF blurring and $G^{ju}_{j't'}$ which applies the required correlations between UIS time points. There is also the visible space to data space mapping with components $B^{k}_{ju}$ which is the product of $P^{j'p}_{ju}$ which applies the pusher pattern and maps UIS time points to push times and $Q^{k}_{j'p}$ which collapses the distinct push time spectra into a single spectrum.

Figure 8:
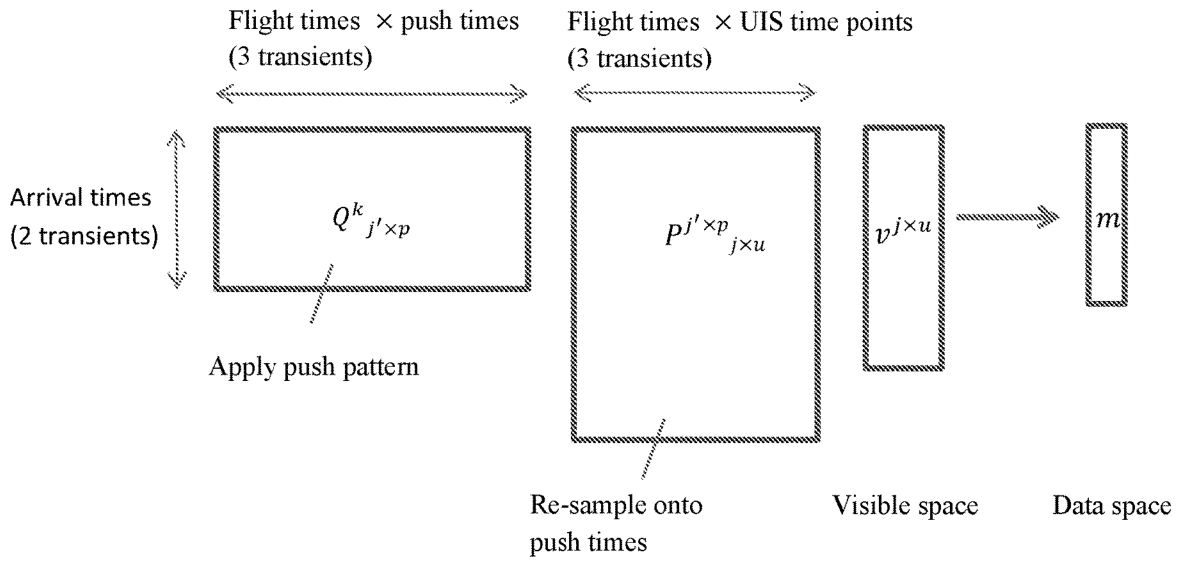
FIG. 8 illustrates a mapping between the broadened flight times (in visible space) and the EFP arrival times (in data space) that takes into account a re-sampling between time points for an upstream ion separation and the EFP pattern.

These mappings are visualised as having been unfolded into matrix operations in FIG. 7 and FIG. 8.

In contrast to the steady state condition for the components of $B^{k}_{j}$, those of the corresponding mapping in the time-resolved system, $Q^{k}_{j'p}$, have the condition:

$$Q^{k}_{j'p} = \begin{cases} 1 & \text{for } t_{j'} + t_p = t_k, \\ 0 & \text{otherwise} \end{cases},$$

without the "mod T" qualifier which enforced the wrap-around boundary condition of the steady state system.

In principle, the entire time series of N transients could be analysed together so that the spectra for all UIS time points are modelled at once. There is a subtle distinction between the case where acquisition has already begun when recording of transient data is turned on and the case where acquisition and recording are started simultaneously. In the latter case, there are no ions pushed in a previous transient in the first recorded transient but there may be in the former case.

The latter case is easier to deal with as all relevant data are available and the number of model transients is the same as the number of data transients. In the former case, however, there is missing, unrecorded, data which is correlated with the data in the first transient—the first transient may contain ions pushed in the previous transient.

Accordingly, there must be a model for the previous transient (transient 0) as it must account for a portion of the data in the first transient. This case is of practical interest because a) it may reflect actual practice and b) it allows us to take a sub-interval of the full time series data which does not start at the start of the acquisition.

Figure 6:
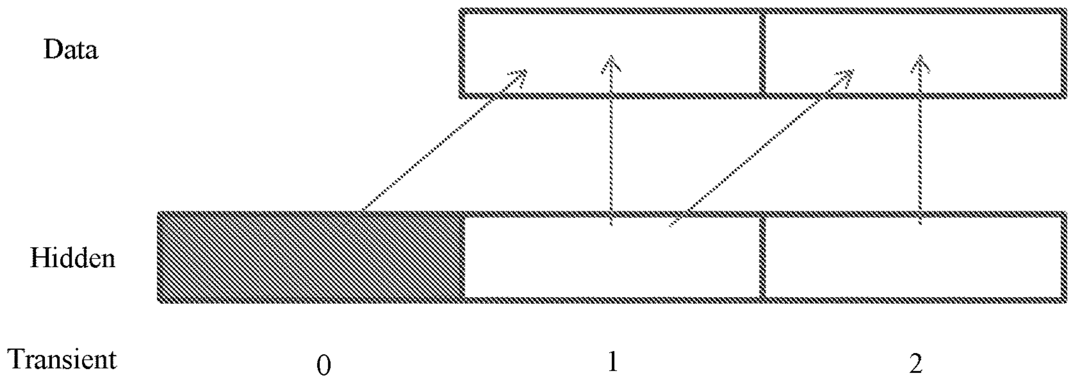
FIG. 6 shows how ion species pulsed during a first transient can be recorded in the next transient.

The situation for N=2 is illustrated in FIG. 6. This arrangement may be moved along a longer time series of transients with the output from the relocated transient 1 being reported each time until transient 2 becomes the final transient and its output is taken as well. Alternatively, a longer sub-interval of transients may be iterated along the time series.

If the option of assigning data to points in visible space is to be used it must take a form different from that used for the steady state analysis. This is because part of the mapping from visible space to data space, $B^{k}_{ju}=Q^{k}_{j'p} P^{j'p}_{ju}$, i.e. $P^{j'p}_{ju}$, resamples or interpolates from UIS time points to push times so it shares out responsibility for different data by different visible space points by construction. For the moment, the output will simply be taken to be the visible space array, $v^{ju}$.

FIG. 6 shows schematically a scheme for decoding EFP spectra where the correlations between UIS time points are less than one transient in the case where the number of transients N=2 but where the acquisition commenced before data recording started. The arrows indicate the data space transients affected by the hidden space transients. The three transients in the current model are those represented in FIG. 7 and FIG. 8. The two data transients are those represented in FIG. 8.

FIG. 7 shows the mapping from the hidden space map to the visible space map. The mapping F embodies the blurring due to the TOF instrument resolution while the mapping G holds the correlations between UIS time points. The unfolding of separate dimensions into a single dimension is indicated by the x symbol.

FIG. 8 shows the mapping from the visible space map to the data space map. The matrix P embodies the re-sampling scheme from UIS time points to push times. The mapping Q describes the pattern of push times, thereby mapping from flight time to arrival times. The result, m, is the mock data, i.e., the model intensities in data space.

An outline of an algorithm will now be given in the context of decoding a fixed number of transients on sub-transient time scales. This scheme may be iterated along a longer time series of transients.

An outline of the non-steady state algorithm will now be provided.

Sub-Transient Time Scale Decoding Algorithm Outline:

1) Setup

Project unit data back to hidden space to get normalisation constants, $$z_{it}=B^k{}_{ju}C^{ju}{}_{it}1_k\alpha 1_{it}.$$

2) On Data Input

Processing will start once both transients are available.

3) Set Initial Model

Set each of the $h^{it}$ to some constant value greater than zero, $\bar{h}$, (perhaps as a multiple of the background level, β), $$h^{it}\leftarrow\bar{h}1^{it}.$$

Project h forward to get initial mock data, m, $$m^k\leftarrow\beta 1^k+B^k{}_{ju}C^{ju}{}_{it}h^{it}.$$

4) Until Termination

Calculate data to mock data to ratios, $$r_k\leftarrow\frac{d^k}{m^k}.$$

Project the ratios back to hidden space, $$g_{it}\leftarrow B^k{}_{ju}c^{ju}{}_{it}r_k.$$

Update hidden sources, $$h^{it}\leftarrow h^{it}\left[\frac{g_{it}}{z_{it}}\right]\text{ (suppressing } ESC\text{)}.$$

Project the hidden sources forward to mock data via visible space, $$v^{ju}\leftarrow C^{ju}{}_{it}h^{it},$$

$$m^k\leftarrow\beta 1^k+B^k{}_{ju}v^{ju}.$$

5) Assign Values to Output Spectra

Copy the visible space vector to the output, $$s^{ju}=v^{ju}.$$

Figure 9:
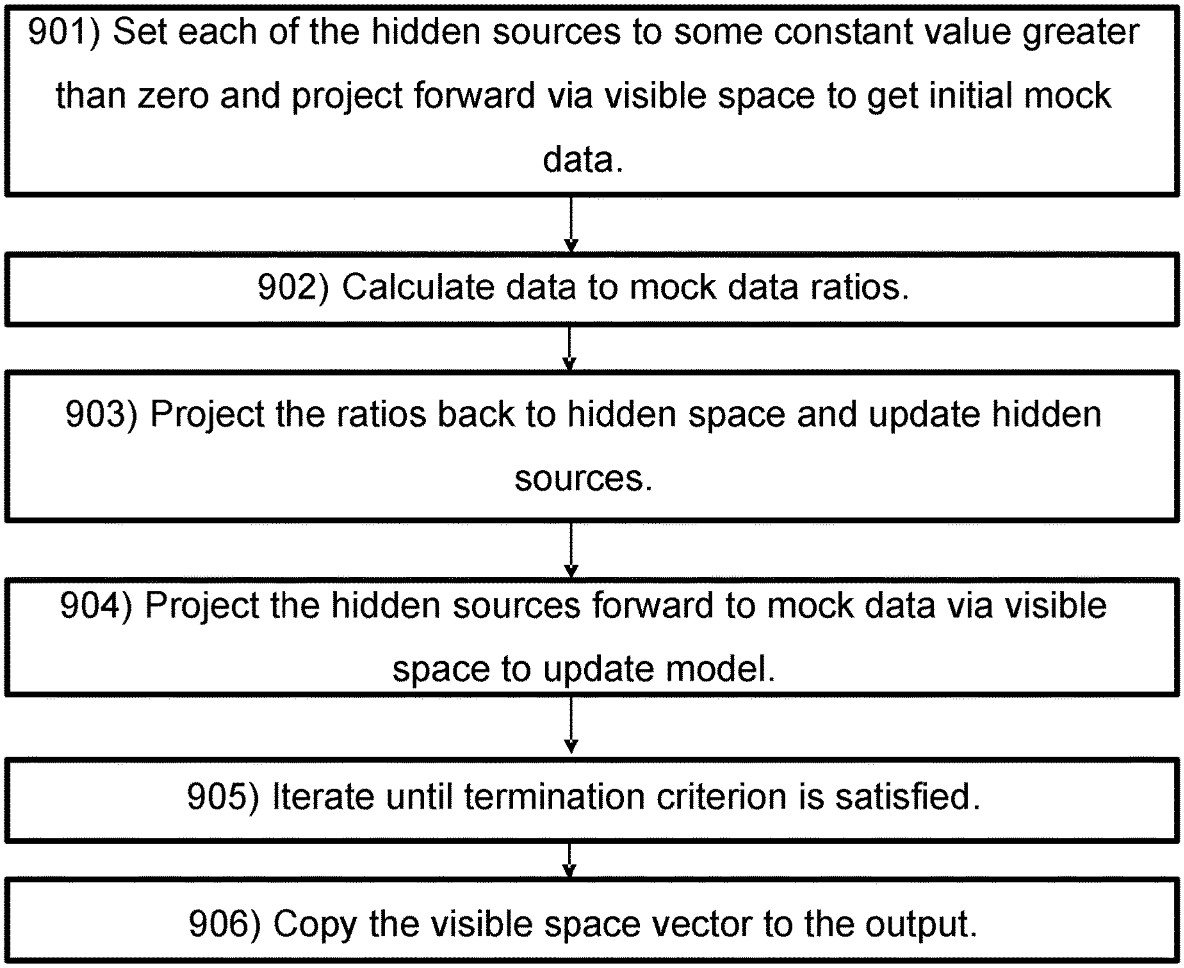
FIG. 9 is a flow chart illustrating a method according to an embodiment.

FIG. 9 is a flow chart illustrating a general method according to an embodiment. As described above, the method comprises setting each of the hidden sources to some constant value greater than zero and project forward via visible space to get initial mock data (step 901), calculating data to mock data ratios (step 902), and projecting the ratios back to hidden space and update hidden sources (step 903). The hidden sources are then projected forwards again to mock data via the visible space in order to update the model (step 904), and this is iterated until the termination criterion is satisfied (step 905).

These projections are performed using a model, of the type described above. For instance, either the steady state or non-steady state algorithms presented above may be used in order to move between hidden, visible and data space.

The visible space vector may then be copied to the output (step 906). However, as explained above, other outputs would also be possible.

Figure 10:
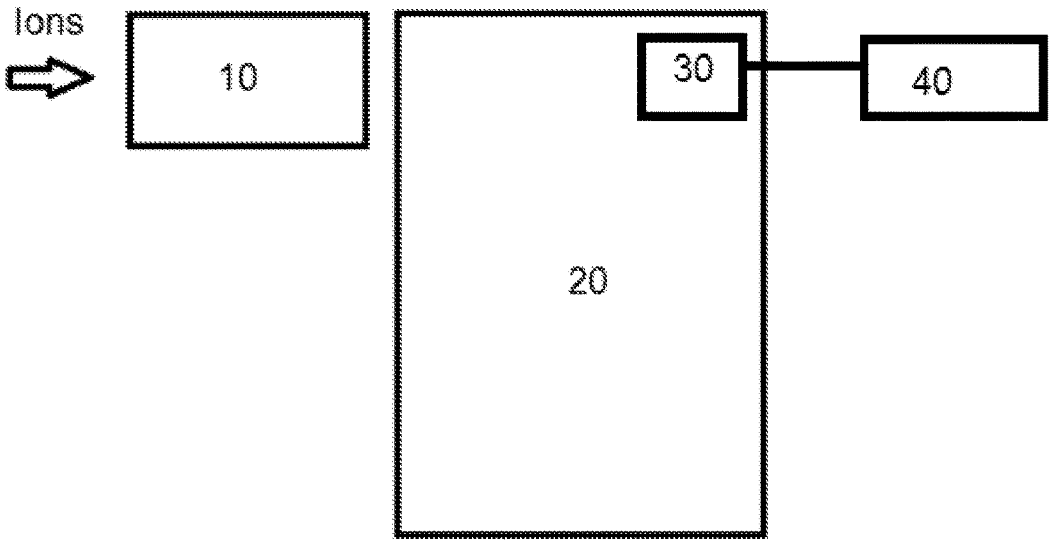
FIG. 10 shows an example of a mass spectrometer that may be operated in accordance with embodiments.

FIG. 10 shows an example of a mass spectrometer that may be operated in accordance with embodiments. As shown in FIG. 10 ions entering the mass spectrometer are first passed into an ion separation device 10 before passing into a ToF mass analyser 20 that is operated in the manner described above. The multiplexed ion signal recorded at a detector 30 of the ToF mass analyser 20 are then passed to suitable decoding circuitry 40 and processed in the manner described above.

The present embodiments thus provide techniques for decoding of EFP multiplexed mass spectral data wherein peak detection has been performed on a transient by transient basis. This is done using a model including two conceptual steps: a first step accounting for the broadening of flight times due to an ion flight time distribution (moving from hidden space into a visible data space) and a second step of encoding of flight times to arrival times via the pattern of pulse times (moving from the visible data space into the data space).

The observed data (in data space) can then be demultiplexed via the visible space back to hidden space. The output may thus comprise any of the unbroadened flight times (in hidden space, to generate a 'super-resolution' spectrum), the broadened flight time signals (the visible spectrum), or the arrival time data assigned to flight time on the basis of the broadened flight time signals.

This approach can also be extended to data where the time profiles associated with upstream ion separation may be less than the duration of a transient by including time point correlations in the broadening described above and allowing each flight time to have a response that may vary with time.

Although the present invention has been described with reference to preferred embodiments, it will be understood by those skilled in the art that various changes in form and detail may be made without departing from the scope of the invention as set forth in the accompanying claims.

The invention claimed is:

1. A method of decoding mass spectral data that has been obtained from a time of flight (ToF) mass analyser operating according to an encoded frequency pulsing (EFP) scheme wherein ions are pulsed into the ToF mass analyser multiple times with non-uniform time intervals between each pulse at such a rate that the mass spectral data contains a set of multiplexed ion signals representing ion arrival times recorded at a detector for ions from different ion pulses, the method comprising:

obtaining a first data set to be decoded, the first data set representing a set of multiplexed ion arrival times recorded using the ToF mass analyser; and decoding the first data set to determine a second data set, the second data set representing one or more demultiplexed mass spectra relating to flight times for the ions that were pulsed into the ToF mass analyser to generate the first data set, wherein the decoding comprises:

(i) generating a mock data set representing the set of multiplexed ion arrival times for a model set of ions, wherein generating the mock data set accounts for the EFP scheme used to pulse the ions into the ToF mass analyser and a flight time distribution for the model set of ions in the ToF mass analyser, (ii) comparing the mock data set with the first data set;

(iii) updating the model set of ions based on the comparison;

(iv) repeating steps (i)-(iii) to iteratively update the model set of ions; and (v) using the updated model set of ions to determine the second data set.

2. The method of claim 1, wherein generating the mock data set comprises obtaining a set of notional unbroadened flight times for the model set of ions, a first step of converting the set of notional unbroadened flight times into a corresponding set of broadened flight times accounting for the flight time distribution in the ToF mass analyser, and a second step of generating a multiplexed mock data set by encoding the corresponding set of broadened flight times based on the EFP pattern.

3. The method of claim 2, wherein the ions have been separated upstream of the ToF mass analyser using an upstream ion separation device such that an intensity of ion species arriving at the ToF mass analyser changes over time.

4. The method of claim 3, wherein the first step further comprises applying a correlation function to the model set of ions representing a time variation of the ions arriving at the ToF mass analyser due to the upstream ion separation.

5. The method of claim 3, wherein the second step further comprises mapping the EFP scheme onto a sampling pattern of the upstream ion separation.

6. The method of claim 3, wherein the upstream ion separation comprises a mass and/or ion mobility separation.

7. The method of claim 1, comprising providing for output as the second data set a model set of broadened flight times.

8. The method of claim 1, comprising providing for output as the second data set a model set of unbroadened flight times.

9. The method of claim 1, comprising providing for output as the second data set a model set of ion arrival time data that has been assigned a flight time on the basis of broadened flight time signals.

10. The method of claim 1, wherein the ToF mass analyser is a multi-reflecting time of flight mass analyser.

11. A method of mass spectrometry comprising:

passing ions to a time of flight (ToF) mass analyser;

operating the ToF mass analyser according to an encoded frequency pulsing (EFP) scheme wherein ions are pulsed into the ToF mass analyser multiple times with non-uniform time intervals between each pulse at such a rate that a mass spectral data set contains overlapping ion signals representing ion arrival times recorded at a detector for the ions from different ion pulses to generate a first data set representing a set of multiplexed ion arrival times recorded using the ToF mass analyser; and decoding the first data set to determine a second data set, the second data set representing one or more demultiplexed mass spectra relating to flight times for the ions that were pulsed into the ToF mass analyser to generate the first data set, wherein the decoding comprises:

(i) generating a mock data set representing the set of multiplexed ion arrival times for a model set of ions, wherein generating the mock data set accounts for the EFP scheme used to pulse the ions into the ToF mass analyser and a flight time distribution for the model set of ions in the ToF mass analyser, (ii) comparing the mock data set with the first data set;

(iii) updating the model set of ions based on the comparison;

(iv) repeating steps (i)-(iii) to iteratively update the model set of ions; and (v) using the updated model set of ions to determine the second data set.

12. The method of claim 11, further comprising separating the ions upstream of the ToF mass analyser.

13. The method of claim 12, comprising separating the ions using an ion mobility separator device.

14. The method of claim 12, comprising separating the ions according to mass or mass to charge ratio.

15. A non-transitory computer readable storage medium storing software code that when executing on a data processor performs a method of decoding mass spectral data that has been obtained from a time of flight (ToF) mass analyser operating according to an encoded frequency pulsing (EFP) scheme wherein ions are pulsed into the ToF mass analyser multiple times with non-uniform time intervals between each pulse at such a rate that a mass spectral data set contains a set of multiplexed ion signals representing ion arrival times recorded at a detector for ions from different ion pulses, the method comprising:

obtaining a first data set to be decoded, the first data set representing a set of multiplexed ion arrival times recorded using the ToF mass analyser; and decoding the first data set to determine a second data set, the second data set representing one or more demultiplexed mass spectra relating flight times for the ions that were pulsed into the ToF mass analyser to generate the first data set, wherein the decoding comprises:

(i) generating a mock data set representing the set of multiplexed ion arrival times for a model set of ions, wherein generating the mock data set accounts for the EFP scheme used to pulse the ions into the ToF mass analyser and a flight time distribution for the model set of ions in the ToF mass analyser, (ii) comparing the mock data set with the first data set;

(iii) updating the model set of ions based on the comparison;

(iv) repeating steps (i)-(iii) to iteratively update the model set of ions; and (v) using the updated model set of ions to determine the second data set.

* * * * *